(12) United States Patent
Fidalgo et al.

(10) Patent No.: US 7,975,915 B2
(45) Date of Patent: Jul. 12, 2011

(54) PERSONALIZED USB-KEY TYPE ELECTRONIC DEVICE AND METHOD FOR MAKING SAME

(75) Inventors: Jean-Christophe Fidalgo, Gemenos (FR); Jean-Charles Biremont, Trets (FR); Lucile Dossetto, La Ciotat (FR); Thierry Karlisch, La Ciotat (FR); Remi Garnier, Auriol (FR); Laurent Valette, Marseilles (FR)

(73) Assignee: Gemalto SA, Meudon (FR)

( * ) Notice: Subject to any disclaimer, the term of this patent is extended or adjusted under 35 U.S.C. 154(b) by 999 days.

(21) Appl. No.: 11/666,753

(22) PCT Filed: Oct. 24, 2005

(86) PCT No.: PCT/EP2005/055490
§ 371 (c)(1),
(2), (4) Date: May 2, 2007

(87) PCT Pub. No.: WO2007/025571
PCT Pub. Date: Mar. 8, 2007

(65) Prior Publication Data
US 2008/0156871 A1    Jul. 3, 2008

(30) Foreign Application Priority Data
Nov. 2, 2004  (FR) .................................. 04 52494

(51) Int. Cl.
*G06K 5/00* (2006.01)

(52) U.S. Cl. ......................................... 235/382; 235/380

(58) Field of Classification Search .................. 235/376, 235/380, 382; 439/135, 144, 177, 283, 620
See application file for complete search history.

(56) References Cited

U.S. PATENT DOCUMENTS

| 5,888,624 | A  | 3/1999  | Haghiri et al. |
| 6,594,154 | B1 | 7/2003  | Brewer et al.  |
| 6,671,808 | B1 | 12/2003 | Abbott et al.  |

(Continued)

FOREIGN PATENT DOCUMENTS

DE    102 33 428 A1    11/2003

(Continued)

OTHER PUBLICATIONS

English translation of a Decision of Refusal dated Mar. 1, 2011 issued in the corresponding Japanese Patent Application No. 2007-538397.

*Primary Examiner* — Thien M Le
(74) *Attorney, Agent, or Firm* — Buchanan Ingersoll & Rooney PC

(57) ABSTRACT

The invention concerns a USB-key type electronic device (73) comprising an electronic circuit mounted on a support (60), a gripping element showing a graphic print and/or customization (p), a protective case (70) arranged at the element so as to cause the graphic print and/or customization to be visible through the case. The invention is characterized in that the graphic print and/or customization is produced on the support (60) bearing the electronic circuit, and in that the case covers directly said support (60). The invention also concerns a method including the following steps: producing an electronic circuit support in the form of a printed smart card with contacts in conformity with the USB standard, producing a graphic customization on a support surface, protecting said graphic customization with a transparent protective shell.

22 Claims, 2 Drawing Sheets

U.S. PATENT DOCUMENTS

| | | |
|---|---|---|
| 7,269,004 B1 * | 9/2007 | Ni et al. .................. 439/607.01 |
| 7,906,956 B2 * | 3/2011 | Matias ........................ 324/133 |
| 2003/0100203 A1 | 5/2003 | Yen |
| 2003/0107877 A1 | 6/2003 | Mennecart et al. |
| 2003/0137859 A1 | 7/2003 | Sugawara |
| 2004/0029421 A1 | 2/2004 | Yen |
| 2004/0074264 A1 | 4/2004 | Kung et al. |
| 2004/0178276 A1 | 9/2004 | Fruhauf et al. |
| 2004/0178278 A1 | 9/2004 | Fruhauf et al. |
| 2004/0259423 A1 | 12/2004 | Elbaz et al. |
| 2006/0046544 A1 * | 3/2006 | Ujii et al. .................... 439/159 |
| 2008/0276099 A1 * | 11/2008 | Nguyen et al. ............... 713/186 |
| 2009/0045802 A1 * | 2/2009 | Matias ........................ 324/133 |

FOREIGN PATENT DOCUMENTS

| | | |
|---|---|---|
| JP | 9-508330 T | 8/1997 |
| JP | 2002-222397 A | 8/2002 |
| JP | 2003-167646 A | 6/2003 |
| JP | 2003-281490 A | 10/2003 |
| JP | 2003-331249 A | 11/2003 |
| JP | 2004-118771 A | 4/2004 |
| JP | 2004-133843 A | 4/2004 |
| JP | 2004-280817 A | 10/2004 |
| WO | WO 03/027946 | 4/2003 |
| WO | WO 03/105065 A1 | 12/2003 |
| WO | 2004/019261 A2 | 3/2004 |

* cited by examiner

PERSONALIZED USB-KEY TYPE ELECTRONIC DEVICE AND METHOD FOR MAKING SAME

The invention concerns personalized electronic devices of the USB-key type and a method for making same.

USB keys are designed to be connected to a USB peripheral port (after the name of the Universal Serial Bus in English) of telecommunication equipment such as a personal computer. The field of use is as vast as that of chip cards and/or card readers (transport of data in secured or non-secured form, Internet access, identification, e-commerce, online payment and cryptography, etc.).

Generally speaking, a key according to the invention comprises a section inserted into the port of the equipment and a section remaining outside the port for handling.

The USB keys currently marketed are relatively expensive and their graphic personalization is limited. Indeed, all these keys are equipped with a standard USB connector, a mechanical and electronic interface and an external casing ensuring protection and mechanical maintenance of the system.

Application PCT/FR 02/03247 describes a manufacturing method for a USB electronic key, in which a module is cut out with contact areas compatible with USB format from a chip card and its thickness is subsequently adjusted, at least at the level of the contact areas, in order to present a thickness compliant with the USB standard.

FIG. 1 illustrates the chip card obtained according to the method above out of which the electronic key 5 is cut. The key comprises a front section 51 designed to be inserted into the USB port of a communication device. This section comprises a module with linear contact areas 28 and an electronic chip arranged underneath and connected to the areas. The key also comprises a rear section 52 intended for grasping it. The key at this stage is almost surrounded by a partial pre-cutout 53, with the exception of the straps connecting it to the card body 27.

The key is also offered with a metallic adapter surrounding the contacts and protecting the module. The annular adaptor requires a modification stage, particularly in the form of metallic grooves in order to provide a function of raising the height of the contacts in the ring.

In a variant without a metallic adaptor, it is necessary to perform local adaptation of the thickness of the key to that of a USB port by wedges fixed to the mini-card under the contacts.

In the latter variant, the key has the disadvantage of exposing the grasping body, located outside the connector, to major stresses related to handling and use (impacts, flexions and scratches). For example, the weight of a bunch of keys hanging on an orifice of the body may result in flexion/torsion stresses which may damage or even break the body, particularly at the junction between the body and the connector.

This document remains silent with regard to electronic and graphic personalization of the key. However, in view of the shape of the contacts in USB format, the method has the disadvantage of requiring electronic personalization machines implementing a USB electronic personalization protocol.

Among other existing keys, one finds in particular keys comprising a printed circuit bearing surface-mounted electronic components (SMC) and on which contact or connection rods are soldered. The assembly is arranged in a lower plastic shell and the upper shell covering the printed circuit except for the end of the contact strips. In certain key models, the shells are translucent with coloration and allow a view of the components fixed to a printed circuit support. Prints and/or graphic personalizations are made on the surface of the shell.

In case of damage to the key, such as breaks or abrasion requiring replacement of the shell, no solution is proposed for replacement of the shell.

A solution would be to return the key to a graphic personalization centre for graphic personalization of a new shell; this is all the more indispensable in that a relationship exists between the digital data stored in the key on the one hand and the printing and/or graphic personalization of the same key on the other hand.

This is the case for example of applications requiring realization of a decorative graphic or logo common to a batch of keys. For this purpose, the graphic personalization comprises a reading stage of a client code digitally inscribed on a circuit in order to command particular graphic personalization and/or decoration. To this end, it is necessary to have a graphic personalization installation that is capable of reading the digital data and of selecting or composing the graphic data as a function of these electronic data.

The invention aims to remedy these aforementioned disadvantages. Its main aim is to design a key structure comprising graphic printing and/or personalization on a body for grasping the key and of which the body for grasping the key is readily repairable or replaceable, particularly by the final user in case of damage.

The invention also proposes an economical method of manufacture of such a key.

In its structure, the invention consists in providing the key with a transparent protection envelope arranged directly above a support bearing graphic printing and/or personalization, this envelope being independent of the graphic and being easily replaceable in case of damage.

Preferably, the support, electronic circuit and the electronic and graphic personalization are performed according to a manufacturing method for a mini chip card.

Therefore, the key with the graphic personalization and/or printing is economical to manufacture and the final user can replace it himself without any need to return the key to the supplier or graphic and electronic personalization centre.

To this end, the subject of the invention is an electronic device, of the USB-key type, comprising an electronic circuit borne by a support, a grasping element showing graphic printing and/or personalization and a protection envelope arranged on the body in order to render the printing and/or graphic personalization visible through the envelope.

It is distinguished by the fact that the graphic printing and/or personalization is performed on the support bearing the electronic circuit and that the envelope directly covers the said support.

The body comprises a support bearing the graphic printing and/or personalization and a protection envelope covering the support in order to render the graphic printing and/or personalization on at least one of the two faces of the support visible through the envelope.

The envelope is preferably a shell made of transparent material.

According to other characteristics of the invention:
  the envelope comprises a window centered on the graphic printing and/or personalization;
  the support comprises a chip card body containing an electronic module comprising contacts in USB format;
  the lower shell comprises a plane directly below the contacts in order to adapt the thickness of the support to the standard thickness of a USB port;

the device furthermore comprises ISO-type contacts in addition to an electronic circuit supporting the ISO and USB communication protocols;

The subject of the invention is also a method for manufacturing an electronic device of the USB-key type, comprising a grasping body and graphic printing and/or personalization on the body.

It is distinguished by the fact that it comprises stages for production of an electronic circuit support in the form of a chip card with contacts compliant with USB standard, for production of graphic printing and/or personalization on a surface of the support and for protection of the graphic printing and/or personalization by a protection envelope covering the support and capable of rendering the graphic printing and/or personalization on the support visible through the shell.

According to other characteristics of the invention:

the shell is transparent;

the method comprises a stage of adaptation of the thickness of the contacts to the thickness of the USB port by means of a plane protecting the lower shell up to the position under the contacts;

the method comprises the following stages according to which ISO-type contacts are provided on the module and an electronic circuit also capable of supporting an ISO protocol and electronic initialization and/or test and/or personalization is performed according to an ISO communication protocol;

the support is extracted from the card body.

Other particularities and advantages of the invention will be apparent from the description of non-limitative examples opposite the drawings below:

FIG. 1, described above, diagrammatically represents a chip card in ISO-standard format of the former art from which a USB key is obtained;

Figure 2:
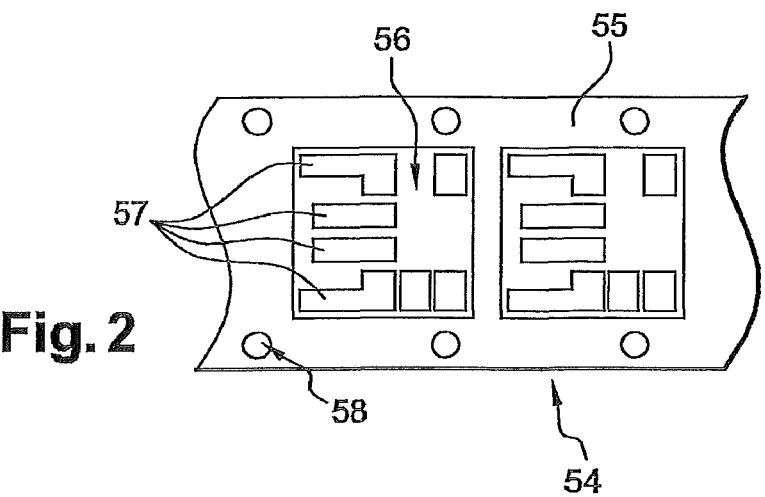
FIG. 2 represents a top view of a ribbon used by the method of the invention and bearing microcircuits or a module.
Figure 4:
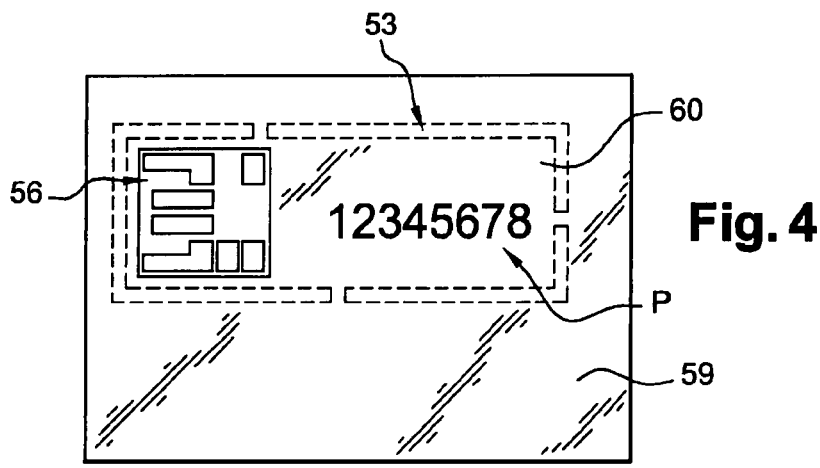
Figure 5:
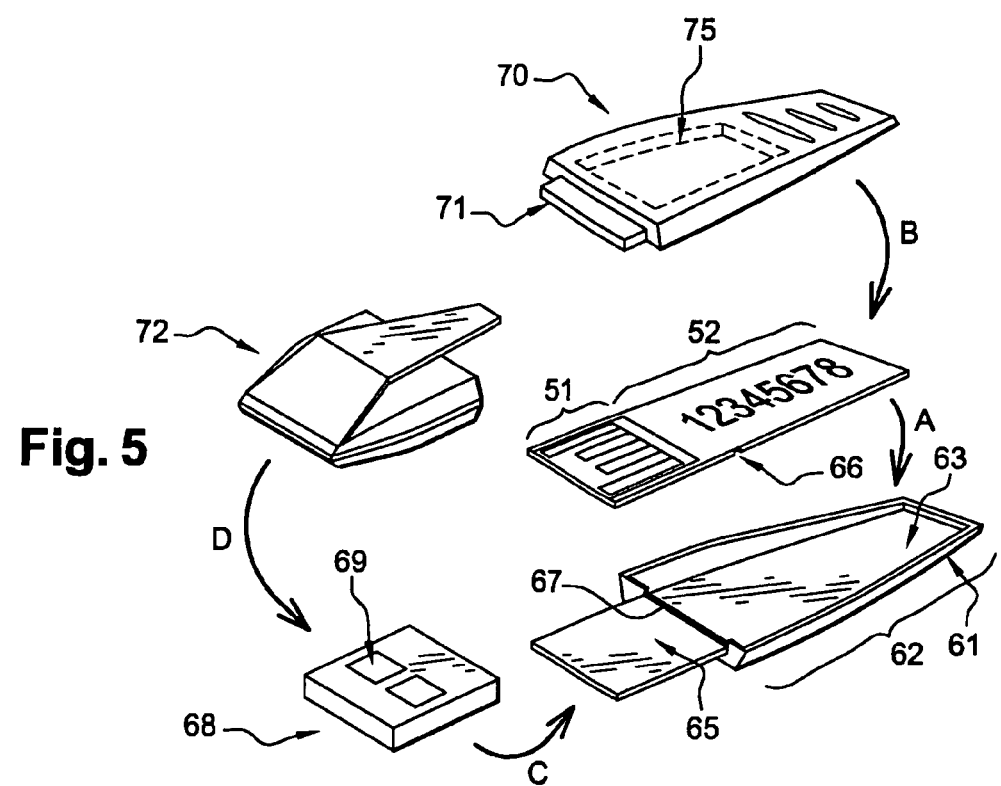
Figure 6:
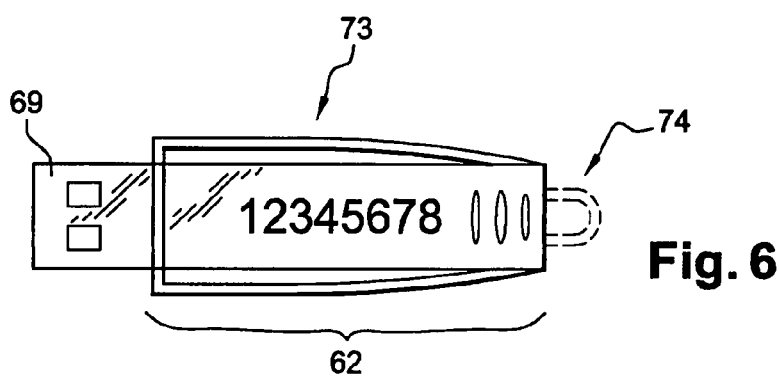

FIG. 4 diagrammatically represents a top view of a chip card according to the invention following graphic personalization and before extraction;

FIG. 5 represents an exploded perspective view of the components of a key according to the invention during assembly;

FIG. 6 represents a key obtained according to a mode of implementation of the method of the invention;

In FIG. 2, the method of manufacture of a USB-type electronic key comprises a stage according to which one starts with a continuous ribbon 54 of the type used in the field of chip cards, based on an engraved or embossed metallic grid. The ribbon in the example is comprised of a dielectric support film 55 bearing a series of microcircuits or a module 56 each comprising conductive patterns. The patterns represent contact areas 57. An electronic chip is attached and its contacts are connected electrically by connection wires through wells arranged in the dielectric support. Any other means of connection known in the chip card field may be suitable.

Protection in the form of application of a drop of insulating resin covers the assembly formed by the chip and the connection wires.

The dielectric involves for example a glass-epoxy film. It comes in the form of a continuous ribbon which can be wound on reels, preferably with lateral perforations 58 for driving the ribbon.

Alternatively, the ribbon may be entirely in the form of a fine metal grid in which the patterns are partially pre-cut.

As in chip card technology, the method therefore employs the same ribbon, in addition to stages of definition of contact areas, if appropriate conductive tracks, chip attachment, connection, coating of the chip, an electrical test and extraction of the module by cutting.

Figure 3:
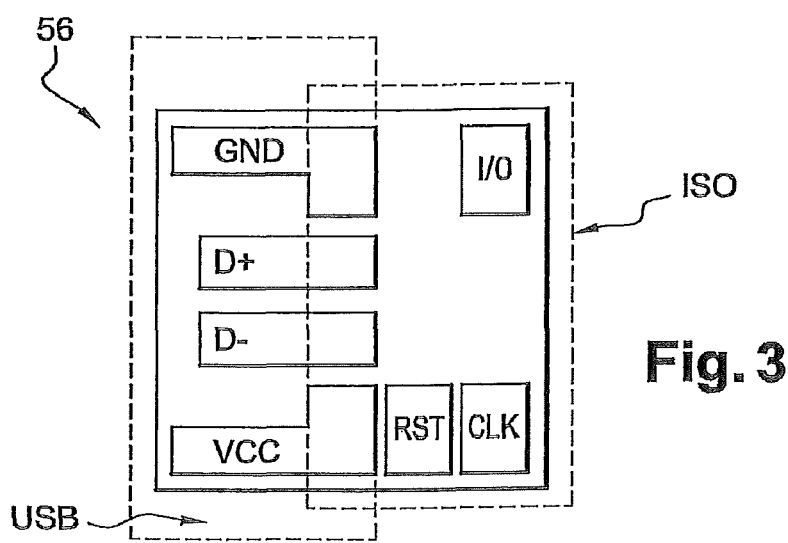
FIG. 3 represents a module according to a preferred variant of the invention, comprising contact areas in USB or ISO format.

As illustrated in FIG. 3, the contact areas of the module are defined in order to correspond to the electrical connection tabs of a USB-type port; i.e. VCC for power supply, another GND for earthing and the two others "D+, D−" for data communication.

In a preferred realization, the module also presents additional contact areas RST, CLK, I/O in order to present ISO-type contacts and allow communication according to the ISO protocol, particularly during the test and/or initialization of the chip and/or during electronic personalization. The additional contacts are positioned behind the USB contacts between the USB contacts and the shell or set back in relation to the front of the connector in order to avoid interfering with standard USB connection to a USB port or in order to be subsequently concealed by a shell or other.

Therefore, the invention allows easy personalization (and/or an electrical test and/or initialization) of the modules without modifying the chip card production tool, even between two batches of chip card with the same ISO communication protocol. This aspect of the invention may be independent from the graphic appearance and the protection envelope, but may contribute to economic production of a key. The invention may also adapt to USB-type personalization and only electrical contacts in USB format.

Figure 1:
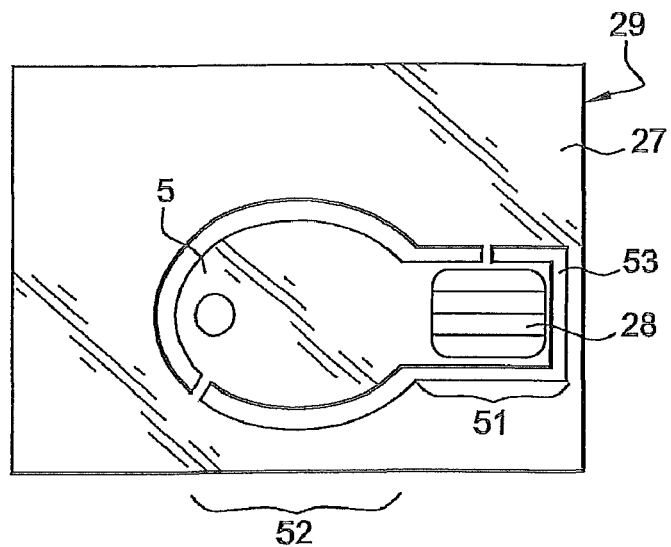

In FIG. 4, the insulated electronic module has been inserted by a "chip card-type" insertion operation in a cavity of a card body 59 in ISO format as in FIG. 1.

Before insertion, the card may comprise decorative graphic printing on one or both of its main faces. This operation may be performed very easily and with optimum quality by chip card technology, unlike keys which have the printing on the shell.

The card of the invention may also comprise a partial pre-cutout 53 of the support 60 in order to facilitate its subsequent extraction, particularly by finger pressure as in FIG. 1.

The card subsequently receives graphic personalization 61 illustrated by the numbers "12345678". The printing is generally of a decorative nature, such as a decorative background, a table or a pattern, for example. The graphic personalization is generally of an informative nature and may in particular comprise a pattern, a logo, alphanumerical data, a number and barcodes related or unrelated to the data numerically contained on the electronic chip. They may both be made on one or both faces of the card.

As on equipment designed for personalization of standard chip cards, the personalization machine allows association of the electronic and graphic personalization data of the card.

Before printing, it is possible to perform verification or automatic selection of printing by reading the chip in order to avoid pairing errors between electronic and graphic personalization. Therefore, for example, secret codes may be associated with data printed on the surface of the body. Different personalizations, at the request of each client or individual, may be made from one support to another in the continuous flow of cards to be printed.

The support 60 comprising the graphic and/or electric personalization is subsequently extracted from the ISO card 59 for its insertion in a shell or casing made of plastic material. The extraction operation may be manual if the support is pre-cut.

Assembly of the key is illustrated in FIG. 5. The assembly stages are observed in the order of the arrows (A, B, C, D). In particular, a shell 61 comprising two essential parts: a concave part 62 providing a reception space 63 of a part 52 of the support bearing the graphic printing and a plane 65 or plate protecting the concave part. After assembly, the support rests completely on the lower shell and the plane extends completely under a front part 51 of the support comprising the contact areas 57.

The function of the plane is to supplement the thickness of the support at the level of the contact areas in order to have a total thickness at this level which complies with the USB standard. The chip card from which the support is derived has a thickness of approximately 0.76 mm, whereas the USB thickness to be achieved is approximately 1.95 mm.

The support may comprise a transverse groove 66 adjacent to the module on its lower face. Its function is to fit into a corresponding rib 67 of the casing located at the junction between the two sub-sections 65/62 of the shell and lock the support in position.

Other means of attachment, which can or cannot be dismantled, particularly by gluing, a clip or a slide known to the man of the trade in order to maintain the support in place in the shell may complete the shell and/or support.

The shell therefore not only performs a protection function in a single piece via its plane, but also a function of adaptor of the support to the thickness of the USB standard.

The key may be used in this manner or if necessary with a USB-type metallic ring (with perforations 69) which together encircle the plane and the end of the support.

The support may nevertheless receive conventional protection in the form of film or varnish or a laminated transparent film in order to protect the printing.

Preferably, the lower half-shell 61 is transparent in order to show another graphic personalization performed on the back of the support. If appropriate, the surface protection is unnecessary since provided by the transparent shell.

If necessary, the support 60 is itself made of transparent material, particularly ABS, polycarbonate or PET. This makes it possible to perform a single graphic personalization of a single visible side on the front or back of the support through the lower shell; this also makes it possible to create a visual effect by combining the logos printed on the two faces of the support.

The transparent protection on the key is preferably performed by an upper half-shell 70. It is arranged above the support in order to cover a portion of the support, in the present case the rear section of the support outside the contact areas and to fit on to the lower shell and sandwich the support.

The upper half-shell may comprise a shoulder 71 of the width of the metallic ring which extends towards the front of the shell. The shoulder may for example extend to the limit of the ISO or USB contact areas after mounting on the support. The same transparent materials may be used. The collar or metallic ring 68 may then surround/encircle the plane, the shoulder and the contacts in order to ensure an addition hold of the two upper and lower half-shells.

The upper half-shell may fit on to the lower half-shell by any appropriate means of attachment. Assembly of the shells may in particular be performed by clipping, gluing, ultrasonic welding, screwing . . .

If necessary, additional personalization may be performed on the support through the transparent shell, particularly by laser.

By means of the invention, the graphic printing and personalization are facilitated at several stages of manufacture of the key while guaranteeing their mechanical protection in addition to easy replacement of their protection in case of damage. It is possible to obtain a key with excellent quality of the printing or graphic personalization, particularly in colour at a high resolution, particularly beyond 600 DPI owing to the printing processes commonly used in the chip card field.

In case of damage to the casing, detachment of the key ring and serious scratches, it is easy to change the casing without needing to perform further graphic personalization with the risk of pairing error with the digital data of the chip.

The method and the key are able to dispense with attachment of the upper shell 67.

In a non-illustrated variant, the adjustment in thickness performed by an already assembled one-piece shell, the general shape of which is the same as the shape resulting from the envelope formed by the two half-shells above, but which presents a frontal introduction slit on a front edge between the plane and the shoulder. All that is necessary is to insert the part 52 of the support through the front of the shell in order to perform thickness adjustment of the part 51 with the plane 65. The support and the shell may respectively comprise additional means of locking them in position in one another, for example hollows/bosses forming a brake to withdrawal of the support from the shell.

Preferably, this shell directly has the final shape of the key with in particular convex shapes towards the rear facilitating handling or forming part of the aesthetic appearance.

Finally, in order to complete the key, the front section of the shell may comprise removable means of the attachment of a protection cap 72.

In one variant, the protection envelope may comprise only one transparent window 75 arranged on a shell (an opaque shell for example) opposite the graphic personalization of the support. The window may simply be an opening passing through a shell to the extent that the graphic personalization may comprise a protection film, a laminated film or a transparent coating of the type of those used for chip cards.

It is noted that in order to arrive at a structure in accordance with the invention, it is necessary to arrange on the support bearing the electronics a surface reserved for graphic personalization which is free of electronic components and/or circuits. This may be achieved by concentrating the electronics outside the zone selected for printing and/or personalization or a microcircuit particularly under the contact areas.

The electronic device obtained, of a USB key type 73, can be seen in FIG. 6. It has a relatively aesthetic form containing the graphic personalization 60 visible through the transparency of the upper shell. Preferably, the shell may comprise a perforation or a ring projecting from the shell to accommodate a key ring holder. Unlike most of the USB keys on the market, the graphic personalization of the invention has the advantage of being indivisible from the electronic circuit or module by means of the same support and of presenting chip card security. Even after replacement of the shell, there is no risk of pairing errors and of breaching the security employed during manufacture of a device presenting a level of security like that of a chip card.

As for electronic personalization, the graphic printing and/or personalization is performed on completely standard machines.

The two transparent plastic shells are clipped (soldered by ultrasound or glued) around the mini card by means of a manual or readily automatable simple operation. Preferably, the two shells have means of assembly of the type which can be taken apart.

This stage does not comprise any difficulty, since the entire personalization has already been performed.

According to a preferred method of implementation, the method comprises the following stages in order, according to which an electrical test is performed according to a communication protocol, followed by a decorative graphic, particularly by printing on at least one of the two faces of a moulded or laminated card body with ISO standard dimensions; the module is subsequently glued into a cavity previously arranged in the card body, the card is electronically and graphically personalized and the card body support is extracted.

One use of the invention envisaged is to have a photograph of the holder or user of the key as a graphic or graphic personalization in order for example to immediately identify the owner of the key.

If necessary, the electronic device also comprises a transponder function. The electronic chip is of the hybrid type for example and comprises a contact-free communication function, of the radiofrequency type for example. To this end, an antenna may be arranged either in the chip card-type module, or extend in or over the card body or in the part 52 of the support bearing the graphic printing. The antenna may preferably extend the graphic printing on the edge of the body. If necessary, the ring may not be metallic in order to avoid creating a radiofrequency screen to the module antenna.

It is also possible to make provision for a relay antenna or passive antenna extending in the support and coupled to the module antenna or indeed the printed circuit in order to increase the communication range. This also makes it possible to avoid an electric connection of the antenna.

The antenna may be connected to the module in a conventional manner to the microcircuit as in hybrid cards with electrical contacts and without contact.

Since it was observed, with surprise, that the width of a USB key (approx. 1.4 mm) was roughly of the width of a personal access swipe card photograph (of at least the face), it was deduced that the key may serve as an identification swipe card and/or a personal access swipe card of the contact-free type.

The key may also be used as a secure key for Internet accesses or in order to allow functioning of a secure workstation.

If necessary, the printing support and the shell may be enlarged at the level of the photograph, in order to have for example a support twice as wide as the width of the metallic ring, or three times wider, at the level of the printing.

The support may comprise one or several LED-type diodes connected to the microcircuit and/or antenna in order to indicate activity of communication or transaction or presence of an electromagnetic field or of connection. The diode may be on the surface of the support in the shell or buried in the body of the card. Illumination may be performed through the support body even if non-transparent and visible from the outside. The photo of the individual may in particular be visible by rear illumination of a diode in the card body.

The printing and/or personalization may comprise a photograph of a user and the device may comprise an LED diode in order to illuminate the photograph and/or the printing.

The LED diode may be placed in the chip card-type module, connected for example next to the printed circuit chip and coated in such a way that the light diffuses through the card body, with the latter being more or less transparent for example or having a light wave guide function. Protective coating of the chip and the LED diode may be in transparent material.

The diode may be supplied in different ways. It may be supplied by the USB port directly or indirectly via a communication chip.

It may be self-supplied by an antenna which is connected to it and independent (without any direct connection) from the main antenna of the swipe card. The antenna of the diode may be coupled to the main antenna in order to avoid connections to the main antenna RF connected to the chip of the printed circuit.

Insofar as an LED diode may emit very intense light, the printing of the support may be a reflective coating, metallic for example, in order to return the illumination of a diode. One application would consist in allowing lighting or a signal by connecting the device to a USB port of a portable object for example having an energy source, such as a portable telephone.

The invention may comprise a method of realization in which the chip comprises several interfaces: a USB interface, a radiofrequency interface RF, an ISO interface if appropriate and a connection for the emitting LED diode if appropriate.

In another method of realization, one may have the function without radiofrequency contact provided by another contact-free chip connected to an antenna and independent from the first chip.

The invention claimed is:

1. An electronic device of the USB key-type for direct connection to a port of an external device while a portion remains outside the external device for handling, comprising an electronic circuit mounted on a support, a grasping body having graphic printing and/or personalization, and a protection envelope arranged on the body in order to render the printing and/or graphic personalization visible through the envelope,
   wherein the graphic printing and/or personalization is disposed on the support bearing the electronic circuit and the envelope directly covers said support.

2. A device according to claim 1, wherein the envelope is a shell made of a transparent material.

3. A device according to claim 1, wherein the envelope comprises a window centred on the graphic printing and/or personalization.

4. A device according to claim 1, wherein the support comprises a chip card body containing an electronic module comprising USB-format contacts.

5. A device according to claim 4, wherein it furthermore comprises additional ISO-type contacts (I/O, CLK, RST) set back from the USB contacts and an electronic circuit supporting the two communication protocols ISO and USB.

6. A device according to claim 1, wherein the envelope is a shell enveloping at least one part of the support.

7. A device according to claim 6, wherein the envelope comprises a lower half-shell and an upper half-shell which engage one another and enclose at least said part of the support.

8. A device according to claim 7, wherein the lower half-shell comprises a plane directly under the contacts in order to adapt the thickness of the support to the standard thickness of a USB port.

9. A device according to claim 7, wherein it comprises a metallic ring of the USB type surrounding the contacts and encircling together the two lower and upper half-shells by means of a shoulder of the upper half-shell and a plane of the lower half-shell.

10. A device according to claim 1, wherein the support is made of a transparent material and comprises graphic printing and/or personalization visible on the back and/or front of the envelope.

11. A device according to claim 1, wherein the printing and/or personalization is a photograph of the user and wherein the device comprises an antenna in order to perform a radiofrequency communication function.

12. A device according to claim 1, wherein the printing and/or personalization comprises a photograph of the user and wherein the device comprises an LED diode in order to illuminate the photograph and/or printing.

13. A method for manufacturing an electronic device of the USB-key type for direct connection to a port of an external device while a portion remains outside the external device for handling, comprising a grasping body and graphic printing and/or personalization on the body, wherein the method comprises the following stages of:

providing an electronic circuit support in the form of a chip card body with contacts complying with the USB standard, providing graphic printing and/or personalization on a surface of said electronic circuit support, and direct protection of the support by a protection shell capable of rendering said graphic printing and/or personalization on the support visible through the shell.

14. A method according to claim 13, wherein the shell is transparent.

15. A method according to claim 13, further comprising a stage of adaptation of the thickness of the support in the area of the contacts to the thickness of a USB port by means of a plane extending a lower portion of the shell under the contacts.

16. A method according to claim 15, wherein the adaptation comprises a stage of fixing a metallic ring around the contacts and the plane.

17. A method according to claim 16, wherein the metallic ring encircles both the plane of the lower portion of the shell and a shoulder of an upper portion of the shell.

18. A method according to claim 13, further comprising the following stages in which, ISO-type contacts are additionally provided on the module and an electronic circuit also capable of supporting an ISO protocol, and personalization and/or an electrical test is performed according to an ISO communication protocol.

19. A method according to claim 13, wherein the support is extracted from a card body of ISO standard dimensions following a graphic and/or electric personalization stage.

20. A method according to claim 13, wherein single printing and/or graphic personalization is performed on one of the faces of the support, the support being made of transparent material.

21. An electronic device for direct connection to a port of an external device while a portion remains outside the external device for handling, comprising an electronic circuit mounted on a support, a grasping body having graphic printing and/or personalization, and a protection envelope arranged on the body in order to render the printing and/or graphic personalization visible through the envelope, wherein the graphic printing and/or personalization is disposed on the support bearing the electronic circuit and the envelope directly covers the support.

22. An electronic device for direct connection to a port of an external device while a portion remains outside the external device for handling, comprising an electronic circuit mounted on a support, contact areas on the support for connection with the external device, a grasping body having graphic printing and/or personalization, and a protection envelope arranged on the body in order to render the printing and/or graphic personalization visible through the envelope, wherein the contact areas are disposed on the same side of the support as the graphic printing and/or personalization and the envelope directly covers the support.

* * * * *